US012750232B2

(12) United States Patent
Hajost

(10) Patent No.: US 12,750,232 B2
(45) Date of Patent: Sep. 29, 2026

(54) IMMUTABLE DOCUMENT SEALING AND AUTHENTICATION

(71) Applicant: Brian H Hajost, Ashburn, VA (US)

(72) Inventor: Brian H Hajost, Ashburn, VA (US)

( * ) Notice: Subject to any disclaimer, the term of this patent is extended or adjusted under 35 U.S.C. 154(b) by 273 days.

(21) Appl. No.: 18/639,537

(22) Filed: Apr. 18, 2024

(65) Prior Publication Data

US 2025/0330328 A1 Oct. 23, 2025

(51) Int. Cl.

| | |
|---|---|
| ***H04L 9/00*** | (2022.01) |
| ***G06F 21/16*** | (2013.01) |
| ***G06T 5/50*** | (2006.01) |
| ***H04L 9/32*** | (2006.01) |

(52) U.S. Cl.

CPC ............ *H04L 9/3236* (2013.01); *G06F 21/16* (2013.01); *G06T 5/50* (2013.01); *G06T 2207/20221* (2013.01)

(58) Field of Classification Search

CPC ....... H04L 9/3236; G06F 21/16; G06F 21/64; G06F 21/00

See application file for complete search history.

(56) References Cited

FOREIGN PATENT DOCUMENTS

| | | | | |
|---|---|---|---|---|
| CN | 104410684 A | * | 3/2015 | ............. G06Q 10/40 |
| EP | 3751526 B1 | * | 5/2024 | ........... G07D 7/0034 |
| JP | 2003309559 A | * | 10/2003 | ......... H04N 21/8358 |
| JP | 2005045486 A | * | 2/2005 | |
| JP | 2022163310 A | * | 10/2022 | ........... G06F 40/151 |

OTHER PUBLICATIONS

"Herzberg, Snowflake security, 2022, Securing Your Snowflake Data Cloud, pp. 1-209" (Year: 2022).*

* cited by examiner

*Primary Examiner* — Kevin Ayala
(74) *Attorney, Agent, or Firm* — CRGO Global; Steven M. Greenberg

(57) ABSTRACT

Immutable document sealing includes loading a digital image of a document into memory of a computer and applying snowflaking to the digital image by incorporating one or more non-visible elements to the digital image. Immutable document sealing additionally includes generating a primary salted hash value based upon the snowflaked digital image to produce an additive value and combining the primary salted hash value with a selected name for the digital image in order to generate a secondary salted hash value of the combination. Finally, Immutable document sealing includes adding the secondary salted hash value to the selected name for the digital image of the document to produce a modified form of the selected name and persisting the encrypted digital image into a new file with the modified form of the selected name as a new name for the new file.

12 Claims, 3 Drawing Sheets

IMMUTABLE DOCUMENT SEALING AND AUTHENTICATION

BACKGROUND OF THE INVENTION

Field of the Invention

The present invention relates to the technical field of document security and more particularly to integrity assurance for archivable documents.

Description of the Related Art

Document security refers to the ability of a document author to secure the content of a document from viewing by an unauthorized individual. Document security also refers to the ability of a document author to ensure the authenticity of a document once transmitted to a viewer without permitting unauthorized modifications to the document. Of course, as to the latter ability, document authenticity also refers to the assurance that a document presented is not a spoof or replacement document for an actual document so as to misrepresent the content of the document to the recipient. Generally, a combination of password protection and encryption provides the mechanism toward assuring document security.

The conventional mix of password protection and encryption require the cooperation of different participants to a document authenticity transaction—particularly when digital certificates are involved. As well, garden variety human steps generally permit a malicious actor to circumvent most technical measures aimed at assuring the authenticity of a document, those steps including generating a duplicate document of the same name as the authentic document and then modifying the portions of the duplicate document as desired by the malicious actor. The very act of a creating the new document as a spoof to the authentic document places most of the security measures aimed at securing the document at the disposal of the malicious actor to the detriment of the unwitting recipient of the spoofed document.

BRIEF SUMMARY OF THE INVENTION

Embodiments of the present invention address technical deficiencies of the art in respect to document protection and the assurance that the content of the document has not been modified. To that end, embodiments of the present invention provide for a novel and non-obvious method for immutable document sealing. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for immutable document sealing includes loading a digital image of a document into memory of a computer and applying snowflaking to the digital image by incorporating one or more non-visible elements to the digital image. The method additionally includes generating a primary salted hash value from at least a portion of the snowflaked digital image. As it will be understood, a salted hash value refers to the use of random data—a salt—as an additional input to a hash function that hashes content to produce the hash value, which optionally, is stored within a non-visible area of the snowflaked digital image. Here, the primary salted hash value is then combined with a selected name for the digital image in order to generate a secondary salted hash value of the combination. Finally, the method includes adding the secondary salted hash value to the selected name for the digital image of the document to produce a modified form of the selected name and persisting the snowflaked digital image into a new file with the modified form of the selected name as a new name for the new file.

In one aspect of the embodiment, once the document has been persisted with the modified form of the selected name, the document subsequently can be authenticated according to the following process. The new file name for the new file is extracted and then the selected name is extracted from the new file name along with the secondary salted hash value. A document salted hash is then computed for the new file along with a file salted hash for the new file. As well, a file name salted hash is computed for the document hash in combination with the selected name. Thereafter, a combined salted hash of the document hash and the file name salted hash is computed. The combined hash may then be compared to the secondary salted hash value. In response, the new file is considered authenticated on condition that the comparison results in a determination that the combined salted hash is identical to the secondary salted hash value.

Other aspects of the embodiment pertain to the random embedding of the non-visible elements, based on file type of the document, during snowflaking. Those aspects include:

- tattooing the digital image content with random non-displayable characters;
- tattooing the digital image content with one or more randomly positioned non-visible image elements; or
- for each page of text of the digital image of the document, generating a raster image of the page of text, overlaying the raster image over the page of text in the digital image so that only the raster image displays while the page of text is obscured from view by the raster image in a document editor and embedding the non-visible elements into the page of text.

In another embodiment of the invention, a data processing system is adapted for immutable document sealing. The system includes a host computing platform of one or more computers, each with memory and one or processing units including one or more processing cores. The system further includes persistent storage accessible by the host computing platform. Finally, the system includes a sealing module. The module includes computer program instructions enabled while executing in the memory of at least one of the processing units of the host computing platform to perform immutable document sealing.

Specifically, immutable document sealing includes loading a digital image of a document into memory of a computer and applying snowflaking to the digital image by incorporating one or more non-visible elements to the digital image. Immutable document sealing additionally includes generating a primary hash value from at least a portion of the snowflaked digital image and combining the primary salted hash value with a selected name for the digital image in order to generate a secondary salted hash value of the combination. Finally, Immutable document sealing includes adding the secondary salted hash value to the selected name for the digital image of the document to produce a modified form of the selected name and persisting the snowflaked digital image into a new file with the modified form of the selected name as a new name for the new file.

In this way, the technical deficiencies of the conventional manner of securing the authenticity of a document are overcome owing to the combination of snowflaking the document image into uniqueness and then integrating the uniqueness of the document image with the document naming of the document image itself so as to render the linkage between document name and document unbreakable. In this way, no amount of human step recreation of the document into a spoofed document image of common name with the authentic document will be possible as the document name of the spoofed document image will not comport with the content of the spoofed document image owing to the snowflaking of the authentic document.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for immutable document sealing. In accordance with an embodiment of the invention, a document image is subjected to random snowflaking in order to ensure the uniqueness of the document image. A salted hash is then generated for the snowflaked image and the salted hash is combined with a proposed name for the document image, the combination being subjected to another hashing to produce a secondary salted hash value. The secondary salted hash value is then combined with the proposed name as the new name for the document and the snowflaked image is persisted to storage with the new name. Consequently, upon subsequent authentication, a newly computed secondary salted hash value for a suspect document can be confirmed by matching the newly computed secondary salted hash value to the portion of the name of the suspect document referring to the secondary salted hash value.

Figure 1:
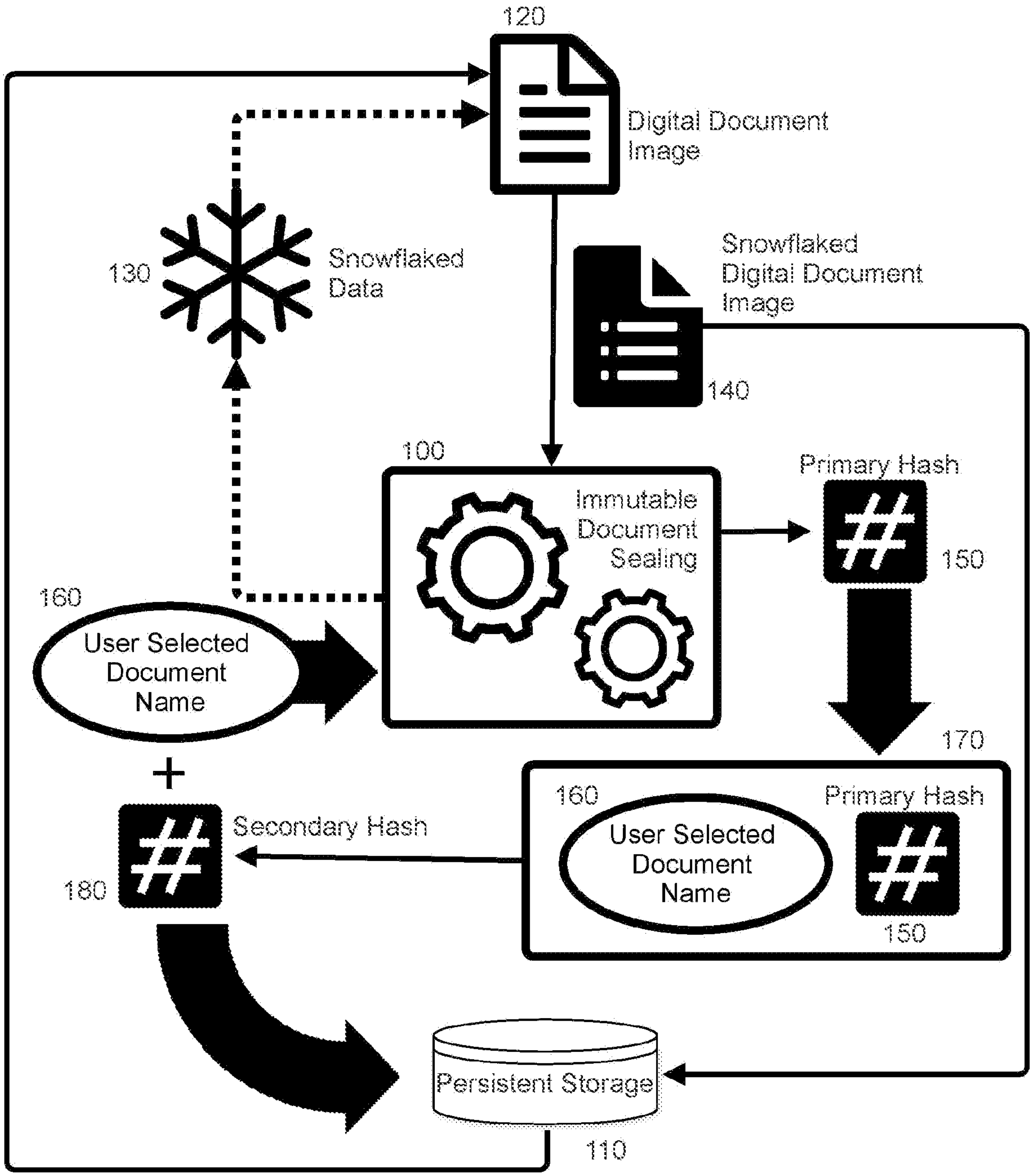
FIG. 1 is a pictorial illustration reflecting different aspects of a process of immutable document sealing.

In illustration of one aspect of the embodiment, FIG. 1 pictorially shows a process of immutable document sealing. As shown in FIG. 1, immutable document sealing logic 100 applies snowflaked data 130 to a digital document image 120 in order to produce a snowflaked digital document image 140. In this regard, the snowflaked data 130 can include a randomly generated value combined with data derived from a context of the digital document image 120, including data stored within the digital document image 120, whether visible or hidden as meta-data, data stored as part of the software installation of the immutable document sealing logic 100 processing the digital document image 120, or environmental data determinable at a time of processing the digital document image 120 by the immutable document sealing logic 100.

The derived context can include, by way of example, unique information stored within the immutable document sealing logic 100 that had been generated at a time of installation of the immutable document sealing logic 100. The derived context also can include a date and/or time when the digital document image 120 had been created or last opened, the name of the digital document image 120. Finally, the derived context can be actual visible elements of the digital document image 120 such as a portion of or the entirety of text of the digital document image 120, or actual hidden elements of the digital document image 120 such as meta-data stored within the digital document image 120, in order to produce the snowflaked digital document image 140.

During the snowflaking process, the immutable document sealing logic 100 adds the snowflaked data 130 to the digital document image 120 in a manner obscured from view. Examples include placing a raster image of at least a portion of the digital document image 120 in a non-visible layer of the digital document image 120. Other examples include inserting obscured pixel-wise elements at randomly selected locations into the digital document image 120, a process known as tattooing, and limiting visibility of the pixel-wise elements by applying a coloring to the pixel-wise elements consistent with a background color of the digital document image 120. Yet further examples include embedding the unique information as non-visible meta-data within the digital document image 120.

Once the immutable document sealing logic 100 has applied the snowflaked data 130 to the digital document image 120 to produce the snowflaked digital document image 140, the immutable document sealing logic 100 computes a primary salted hash value 150 for the snowflaked digital document image 140 and generates a combination 170 of the primary hash 150 and a user selected document name 160 for the digital document image 120. The immutable document sealing logic 100 then computes a secondary salted hash value 180 for the combination 170 and concatenates the secondary salted hash value 180 with the user selected document name 160 to produce a new name for the snowflaked digital document image 140 which is then stored in persistent storage 110.

Figure 2:
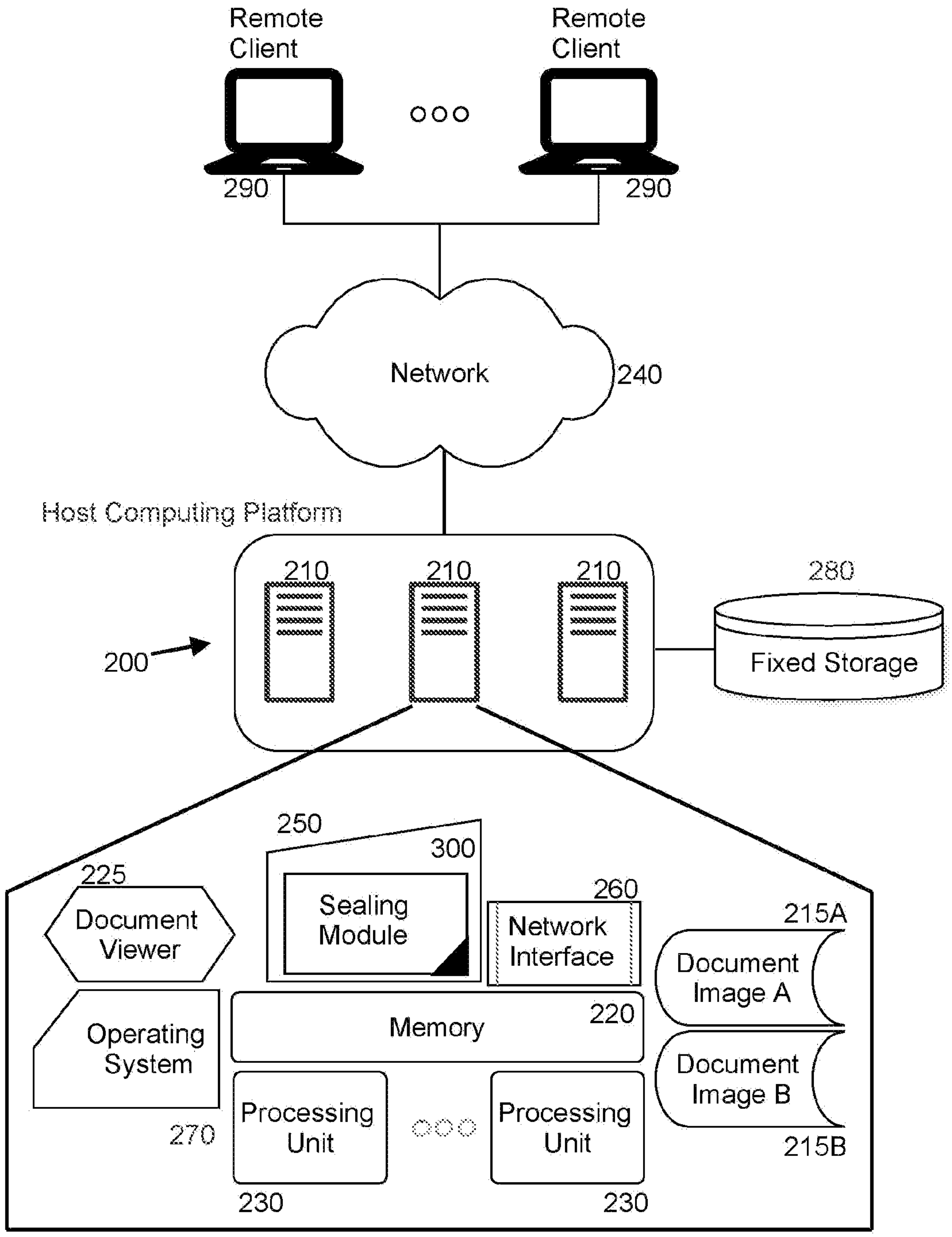
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform immutable document sealing. In the data processing system illustrated in FIG. 1, a host computing platform 200 is provided. The host computing platform 200 includes one or more computers 210, each with memory 220 and one or more processing units 230. The computers 210 of the host computing platform (the detail of only a single computer shown for the purpose of illustrative simplicity) can communicatively access fixed storage 280 and can be co-located within one another and in communication with one another over a local area network, or over a data communications bus, or the computers can be remotely disposed from one another and in communication with one another through network interface 260 over a data communications network 240.

Notably, a computing device 250 including a non-transitory computer readable storage medium can be included with the data processing system 200 and accessed by the processing units 230 of one or more of the computers 210. An operating system 270 executes by the one or more processing units 230 and facilitates the execution of different computer program modules. To that end, the computing device stores 250 thereon or retains therein a program module 300 that includes computer program instructions which when executed by one or more of the processing units 230, performs a programmatically executable process for immutable document sealing.

Specifically, the program instructions during execution process a document image 215A in the memory 220 and viewable in document viewer application 225 to produce a snowflaked document image 215B. The snowflaked document image 215B is produced by the program instructions by determining a file type for the document image 215A and matching the file type to an associated tattooing methodology receiving a random value as a seed to the methodology, such as by embedding a particular pixel or collection of pixels at randomly selected locations of the document image 215A, or by increasing the size of the document image 215A to a randomly larger size and then decreasing the size of the document image 215A to the original size, to name two possibilities. The program instructions further compute a primary salted hash value for the snowflaked document image 215B and additionally compute a secondary salted hash value for a combination of the primary salted hash value and a selected name for the document image 215A. The program instructions then generate a new name combining the selected name and the secondary salted hash value in order to direct the operating system 270 to persist the snowflaked document image 215B to fixed storage 280.

Subsequently, the persisted form of the snowflaked document image 215B can be retrieved from the fixed storage 280 from a remote client 290. The remote client 290 can then confirm the authenticity of the retrieved document by parsing out the selected name for the retrieved document and the appended value. A primary salted hash value is then generated for the retrieved document and combined with the selected name from which the secondary salted hash value is generated. To the extent that the secondary salted hash value matches the appended value, the authenticity of the retrieved document can then be confirmed.

Figure 3:
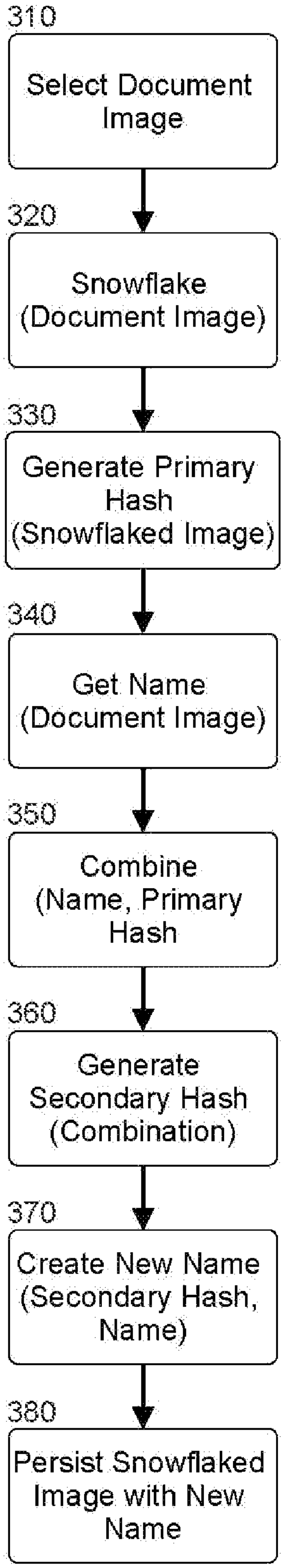

In further illustration of an exemplary operation of the module, FIG. 3 is a flow chart illustrating one of the aspects of the process of FIG. 1. Beginning in block 310, a document image is selected for immutable security. In block 320, snowflaked data is applied to the selected document image to produce a snowflaked document image. Specifically, a random number is generated and then one of several different tattooing techniques for respectively different file types is selected based upon a corresponding file type of the selected document. In block 330, a primary hash is computed from the snowflaked document image and in block 340, a selected name for the selected document image is retrieved and combined with the primary hash in block 350. Then, in block 360 a secondary hash is computed from the combination of the primary hash and the selected name. As such, in block 370 a new name is created by concatenating the secondary hash with the selected name. Finally, in block 380 the snowflaked image is persisted to fixed storage using the new name.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

What is claimed is:

1. A method for immutable document sealing comprising:

loading a digital image of a document into memory of a computer;

applying random snowflaking to the digital image by incorporating one or more non-visible elements to the digital image;

generating a primary salted hash value from at least a portion of the snowflaked digital image;

combining the primary salted hash value with a file name for the digital image and generating a secondary salted hash value of the combination;

adding the secondary salted hash value to the file name for the digital image of the document to produce a modified form of the file name; and, persisting the snowflaked digital image into a new file with the modified form of the file name as a new name for the new file; and, authenticating the new file by:

extracting the new file name for the new file and extracting from the new file name the file name and the secondary salted hash value;

computing a document hash for the new file and computing a file hash for the new file, while also computing a file name hash for the document hash in combination with the file name, and then computing a combined hash of the document hash and the file name hash;

comparing the combined hash to the secondary salted hash value; and, authenticating the new file on condition that the comparison results in a determination that the combined hash is identical to the secondary salted hash value.

2. The method of claim 1, wherein the embedding of the non-visible elements includes tattooing the digital image content with random non-displayable characters selected according to a file type of the document.

3. The method of claim 1, wherein the embedding of the non-visible elements includes tattooing the digital image content with one or more randomly positioned non-visible image elements.

4. The method of claim 1, wherein the embedding of the non-visible elements includes for each page of text of the digital image of the document:

generating a raster image of the page of text;

overlaying the raster image over the page of text in the digital image so that only the raster image displays while the page of text is obscured from view by the raster image in a document editor; and, embedding the non-visible elements into the page of text.

5. A data processing system adapted for immutable document sealing, the system comprising:

a host computing platform comprising one or more computers, each with memory and one or processing units including one or more processing cores;

persistent storage accessible by the host computing platform; and, a sealing module comprising computer program instructions enabled while executing in the memory of at least one of the processing units of the host computing platform to perform:

loading a digital image of a document into the memory;

applying random snowflaking to the digital image by incorporating one or more non-visible elements to the digital image;

generating a primary salted hash value from at least a portion of the snowflaked digital image;

combining the primary salted hash value with a file name for the digital image and generating a secondary salted hash value of the combination;

adding the secondary salted hash value to the file name for the digital image of the document to produce a modified form of the file name; and, persisting the snowflaked digital image into a new file with the modified form of the file name as a new name for the new file; and, authenticating the new file by:

extracting the new file name for the new file and extracting from the new file name the file name and the secondary salted hash value;

computing a document hash for the new file and computing a file hash for the new file, while also computing a file name hash for the document hash in combination with the file name, and then computing a combined hash of the document hash and the file name hash;

comparing the combined hash to the secondary salted hash value; and, authenticating the new file on condition that the comparison results in a determination that the combined hash is identical to the secondary salted hash value.

6. The system of claim 5, wherein the embedding of the non-visible elements includes tattooing the digital image content with random non-displayable characters selected according to a file type of the document.

7. The system of claim 5, wherein the embedding of the non-visible elements includes tattooing the digital image content with one or more randomly positioned non-visible image elements.

8. The system of claim 5, wherein the embedding of the non-visible elements includes for each page of text of the digital image of the document:

generating a raster image of the page of text;

overlaying the raster image over the page of text in the digital image so that only the raster image displays while the page of text is obscured from view by the raster image in a document editor; and, embedding the non-visible elements into the page of text.

9. A computing device comprising a non-transitory computer readable storage medium having program instructions stored therein, the instructions being executable by at least one processing core of a processing unit to cause the processing unit to perform immutable document sealing, by:

loading a digital image of a document into memory of a computer;

applying random snowflaking to the digital image by incorporating one or more non-visible elements to the digital image;

generating a primary salted hash value from at least a portion of the snowflaked digital image;

combining the primary salted hash value with a selected name for the digital image and generating a secondary salted hash value of the combination;

adding the secondary salted hash value to the selected name for the digital image of the document to produce a modified form of the file name; and, persisting the snowflaked digital image into a new file with the modified form of the file name as a new name for the new file; and, authenticating the new file by:

extracting the new file name for the new file and extracting from the new file name the file name and the secondary salted hash value;

computing a document hash for the new file and computing a file hash for the new file, while also computing a file name hash for the document hash in combination with the file name, and then computing a combined hash of the document hash and the file name hash;

comparing the combined hash to the secondary salted hash value; and, authenticating the new file on condition that the comparison results in a determination that the combined hash is identical to the secondary salted hash value.

10. The device of claim 9, wherein the embedding of the non-visible elements includes tattooing the digital image content with random non-displayable characters selected according to a file type of the document.

11. The device of claim 9, wherein the embedding of the non-visible elements includes tattooing the digital image content with one or more randomly positioned non-visible image elements.

12. The device of claim 9, wherein the embedding of the non-visible elements includes for each page of text of the digital image of the document:

generating a raster image of the page of text;

overlaying the raster image over the page of text in the digital image so that only the raster image displays while the page of text is obscured from view by the raster image in a document editor; and, embedding the non-visible elements into the page of text.

* * * * *